United States Patent
Yang et al.

(10) Patent No.: US 6,836,415 B1
(45) Date of Patent: Dec. 28, 2004

(54) PRIMARY-SIDE REGULATED PULSE WIDTH MODULATION CONTROLLER WITH IMPROVED LOAD REGULATION

(75) Inventors: Ta-yung Yang, Milpitas, CA (US); Chem-Lin Chen, Taipei, CA (US); Jenn-yu G. Lin, Taipei (TW); Song-Yi Lin, Taipei (TW)

(73) Assignee: Systems General Corp., Taipei Hsien (TW)

( * ) Notice: Subject to any disclaimer, the term of this patent is extended or adjusted under 35 U.S.C. 154(b) by 50 days.

(21) Appl. No.: 10/465,161

(22) Filed: Jun. 18, 2003

(51) Int. Cl.[7] .............................................. H02M 3/335
(52) U.S. Cl. .................. 363/21.01; 363/21.18
(58) Field of Search ................................ 363/20, 21.01, 363/21.12, 21.13, 21.15, 21.16, 21.17, 21.18

(56) References Cited

U.S. PATENT DOCUMENTS

| 5,408,401 A | * | 4/1995 | Miyazaki | 363/21.08 |
| 5,734,564 A | * | 3/1998 | Brkovic | 363/21.16 |
| 5,903,452 A | * | 5/1999 | Yang | 363/97 |
| 6,542,387 B2 | * | 4/2003 | Tsuge | 363/21.01 |
| 6,646,897 B1 | * | 11/2003 | Lomax et al. | 363/97 |
| 6,661,679 B1 | * | 12/2003 | Yang et al. | 363/41 |
| 6,693,810 B2 | * | 2/2004 | Robinson et al. | 363/97 |
| 6,721,192 B1 | * | 4/2004 | Yang et al. | 363/21.18 |

* cited by examiner

*Primary Examiner*—Adolf Berhane
(74) *Attorney, Agent, or Firm*—J.C. Patents (57) ABSTRACT

The present invention provides a primary-side regulated PWM controller with improved load regulation. In every PWM cycle, a built-in feedback voltage samples and holds a flyback voltage from the auxiliary winding of the transformer via a sampling switch and generates a feedback voltage accordingly. A bias current sink pulls a bias current that is proportional to the feedback voltage. Via a detection resistor, the bias current will produce a voltage drop to compensate the voltage drop of an output rectifying diode as the output load changes. According to the present invention, the bias current can enable the PWM controller to regulate the output voltage very precisely without using a secondary feedback circuit.

15 Claims, 7 Drawing Sheets

PRIMARY-SIDE REGULATED PULSE WIDTH MODULATION CONTROLLER WITH IMPROVED LOAD REGULATION

BACKGROUND OF THE INVENTION

1. Field of the Invention

The present invention relates to a switching mode power supply, and more particularly relates to a primary-side regulated pulse width modulation (PWM) controller of a switching mode power supply.

2. Description of Related Art

Figure 1:
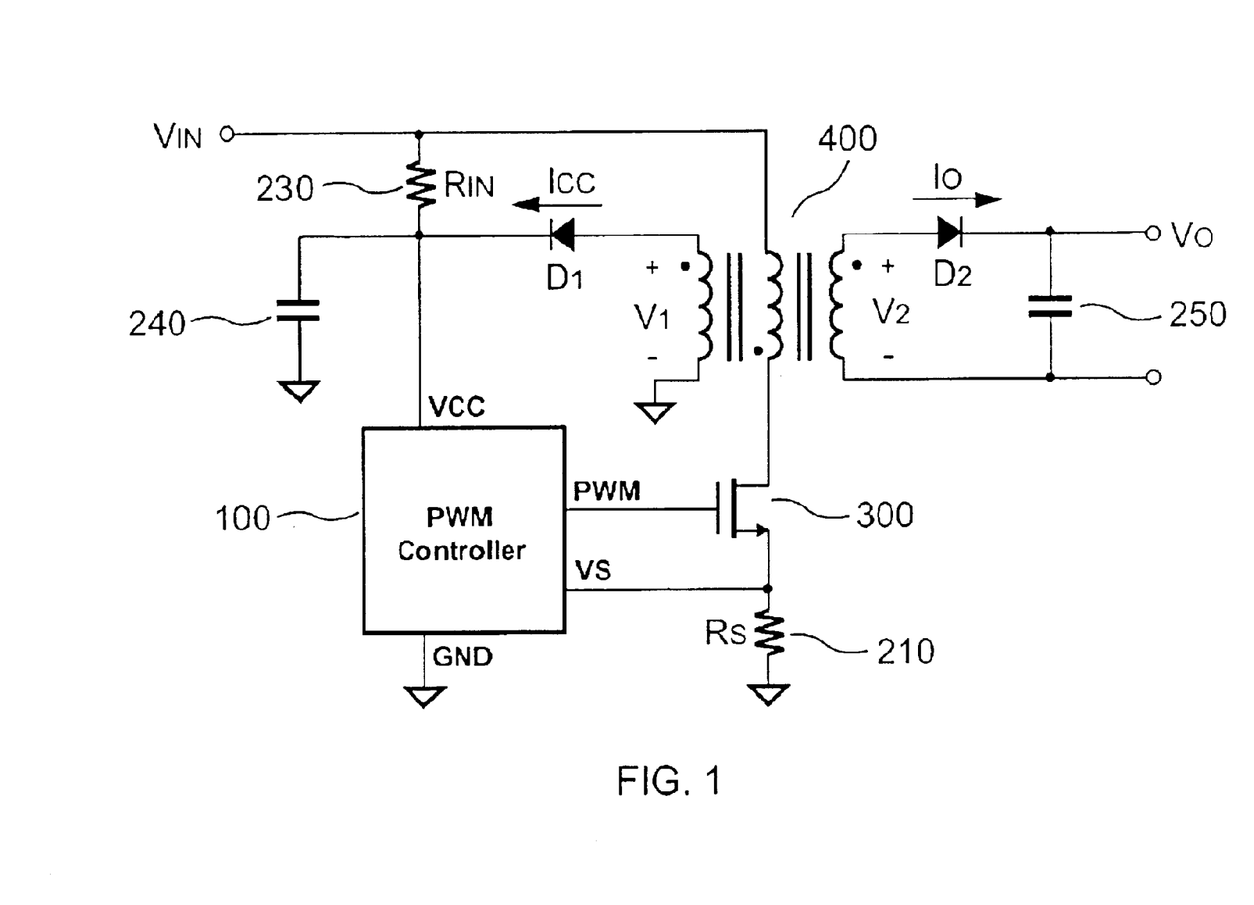
FIG. 1 shows a prior-art PWM controller regulating the output voltage and the output current from the primary side of the transformer.

Switching mode power supplies (SMPS) are commonly used as primary power supplies for computers, telecom devices, and many other products. SMPS designs have many advantages over other types of power supplies, including more efficient power conversion, smaller size, and lighter weight. However, the mass component counts of SMPS designs are still a problem for power supply manufacturers and engineers. Some solutions are provided in the art without secondary-side feedback control, in order to reduce the production costs of the power supply. The applicant of the present invention filed a corresponding patent application in United States, which was titled "PWM controller regulating output voltage and output current in primary side", filed on Mar. 24, 2003 and assigned Ser. No. 10/249,214. All disclosures therein are incorporated herewith. In the corresponding application, as shown in FIG. 1, a flyback power supply without secondary-side feedback control is disclosed. This design couples the output voltage and the supply voltage via a main transformer, so that the supply voltage can be used for voltage regulation, while the output voltage is maintained within a fixed range. The output voltage can be regulated without a secondary-side feedback circuit, so the system cost can be reduced.

Figure 2A:
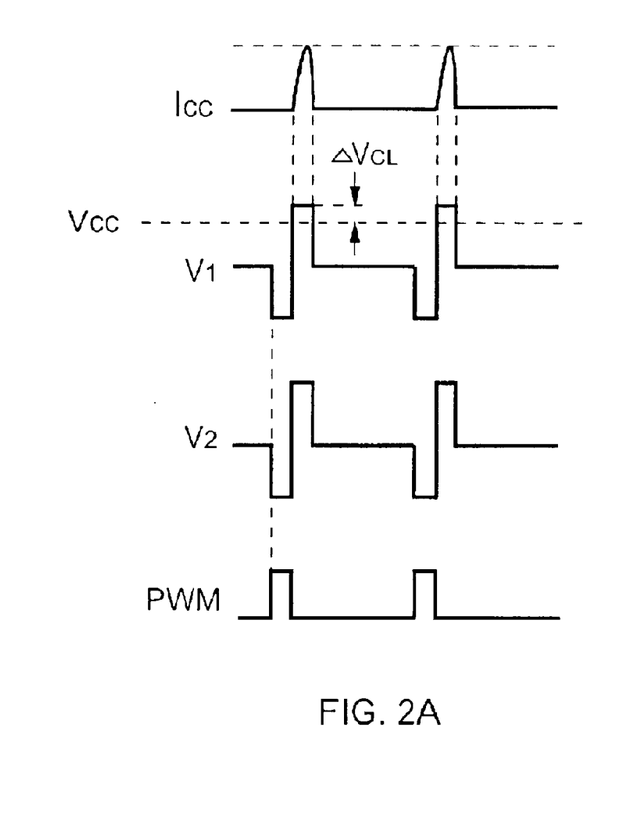
FIG. 2A shows the waveforms observed from the auxiliary winding and the secondary winding under light load conditions.
Figure 2B:
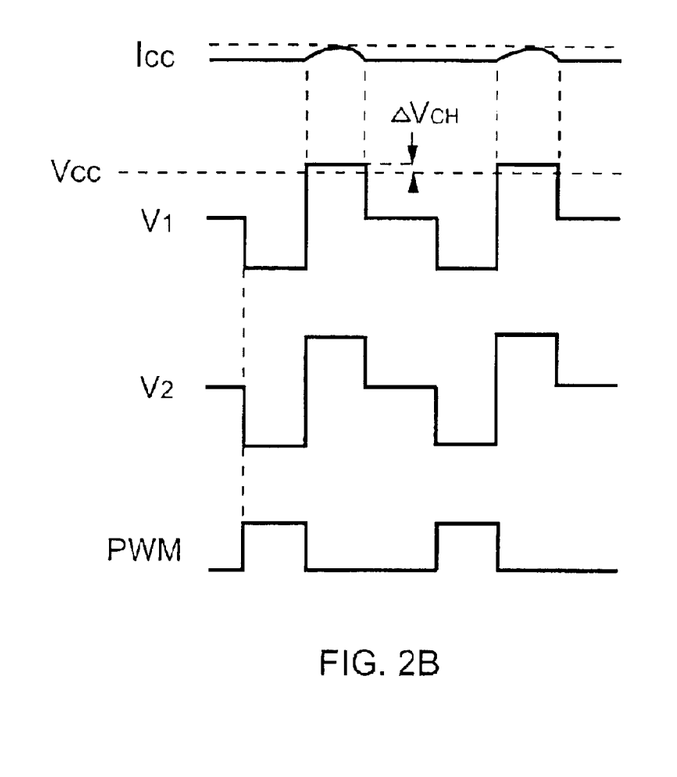
FIG. 2B shows the waveforms observed from the auxiliary winding and the secondary winding under heavy load conditions.

However, the load regulation in the invention is not considered. The precision of the load regulation deteriorates as the power supply load increases. At higher loads, the feedback signal from the auxiliary winding of the main transformer does not precisely follow the output voltage of the power supply. This happens because the rectifying diode of the auxiliary winding feedback signal causes a voltage drop proportional to the load current. FIG. 2A and FIG. 2B demonstrate the adverse effect of the rectifying diode (FIG. 1: $D_1$) on load regulation in the corresponding patent application shown in FIG. 1. As the load current increases, so does the supply current of the auxiliary winding ($I_{CC}$). This causes an increased voltage drop across the rectifying diode. Thus, as the power supply load changes, the relationship of the feedback signal ($V_{CC}$) to the auxiliary winding voltage ($V_1$) and output voltage ($V_2$) will change. To those skilled in the art, it can be seen that because of the rectifying diode $D_1$, the differential voltages $\Delta V_{CL}$ (light load) and $\Delta V_{CH}$ (heavy load) will not be identical. Thus the feedback signal ($V_{CC}$) does not precisely follow variations to the transformer voltage. The voltage regulation. of the prior-art primary-side power supply is not consistent for all power supply loads.

Furthermore, a heavy load current will also result in a larger voltage drop across the output rectifying diode (FIG. 1: $D_2$). Though the auxiliary winding voltage is correlated with the secondary winding voltage, the correlation weakens as the power supply load current increases. This results in a further load regulation problem.

Traditional primary-side PWM controllers can reduce production costs, but they have poor load regulation. Therefore, there is a need for an improved primary-side PWM controller that is suitable for a wider range of power supply output load levels.

SUMMARY OF THE INVENTION

A principal object of the present invention is to provide a primary-side regulated PWM controller with improved load regulation over prior-art designs. The PWM controller uses a bias current that is modulated in response to different output loads to generate different voltage drops across a detection resistor to compensate for the variation of the voltage drop across the output rectifying diode.

According to one aspect of the present invention, voltage regulation is further improved by the addition of a feedback voltage generator. A feedback voltage generator detects the flyback voltage from the auxiliary winding during each PWM cycle via the control of a sampler circuit. A sampling pulse signal generated by the sampler circuit is synchronized by a PWM signal. Cycle-by-cycle monitoring the voltage at the auxiliary winding enables feedback control to be performed more precisely. The present invention substantially improves the stability of the output voltage with respect to load changes.

According to another aspect of the present invention, voltage regulation is further improved by properly selecting the detection resistor to accurately offset the voltage drop for different types of output rectifying diode. Since the voltage drop of the detection resistor is correlated with the voltage drop of the output rectifying diode, this improves the load regulation of the output voltage under changing load conditions.

Another object of the present invention is to reduce production costs. The primary-side feedback control apparatus according to the present invention eliminates the need for secondary-side feedback control circuitry. Therefore the device count, the size of the power supply, and the production cost can be greatly reduced.

According to an aspect of the present invention, the PWM controller with primary side regulation can improve load regulation and output voltage accuracy, while reducing production costs.

It is to be understood that both the foregoing general descriptions and the following detailed descriptions are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 3:
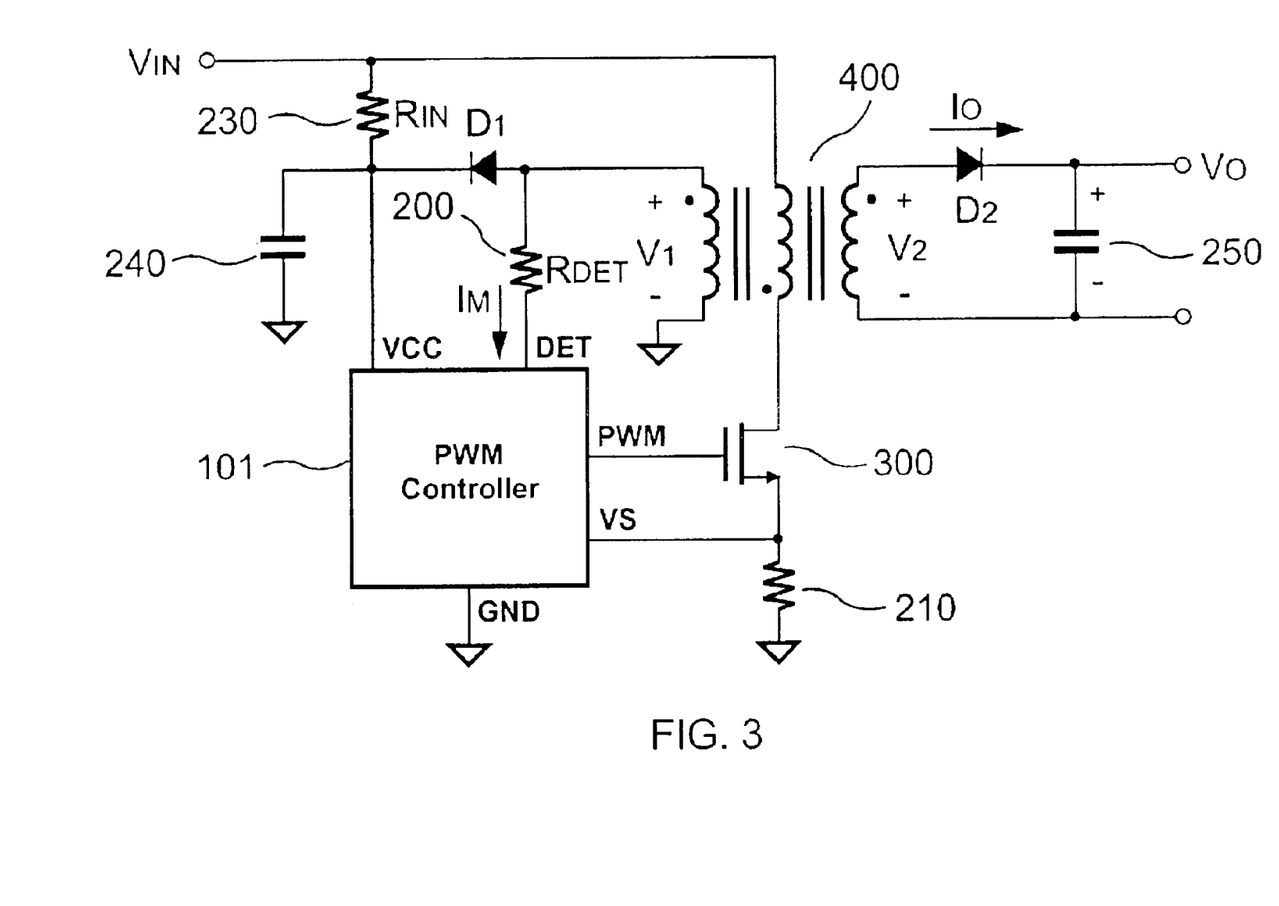
FIG. 3 shows a flyback power supply using a primary-side regulated PWM controller according to the present invention.

FIG. 3 shows a flyback power supply using a primary-side regulated PWM controller 101 according to the present invention. $V_1$ is the flyback voltage of an auxiliary winding of a transformer 400. $V_2$ is the flyback voltage of a secondary winding of the transformer 400. The auxiliary winding supplies the supply voltage $V_{CC}$ through a rectifying diode $D_1$ while the PWM controller 101 is operating. The flyback voltage $V_1$ of the auxiliary winding can be expressed by, $$V_1 = N_A \frac{d\phi}{dt} \quad (1)$$

where $N_A$ is the turn number of the auxiliary winding and $\phi$) is the magnetic flux of the transformer 400.

The flyback voltage V2 of the secondary winding can be expressed by, $$V_2 = N_S \frac{d\phi}{dt} \quad (2)$$

where $N_S$ is the turn number of the secondary winding,
From equations (1) and (2), then $$V_1 = \frac{N_A}{N_S} \times V_2 \quad (3)$$

As observed above, the flyback voltage V, of the auxiliary winding is correlated with the flyback voltage V2. Since the flyback voltage of the auxiliary winding is correlated with the voltage of the secondary winding, the feedback control circuit can be built at the primary-side (auxiliary winding side) of the transformer 400.

Figure 4:
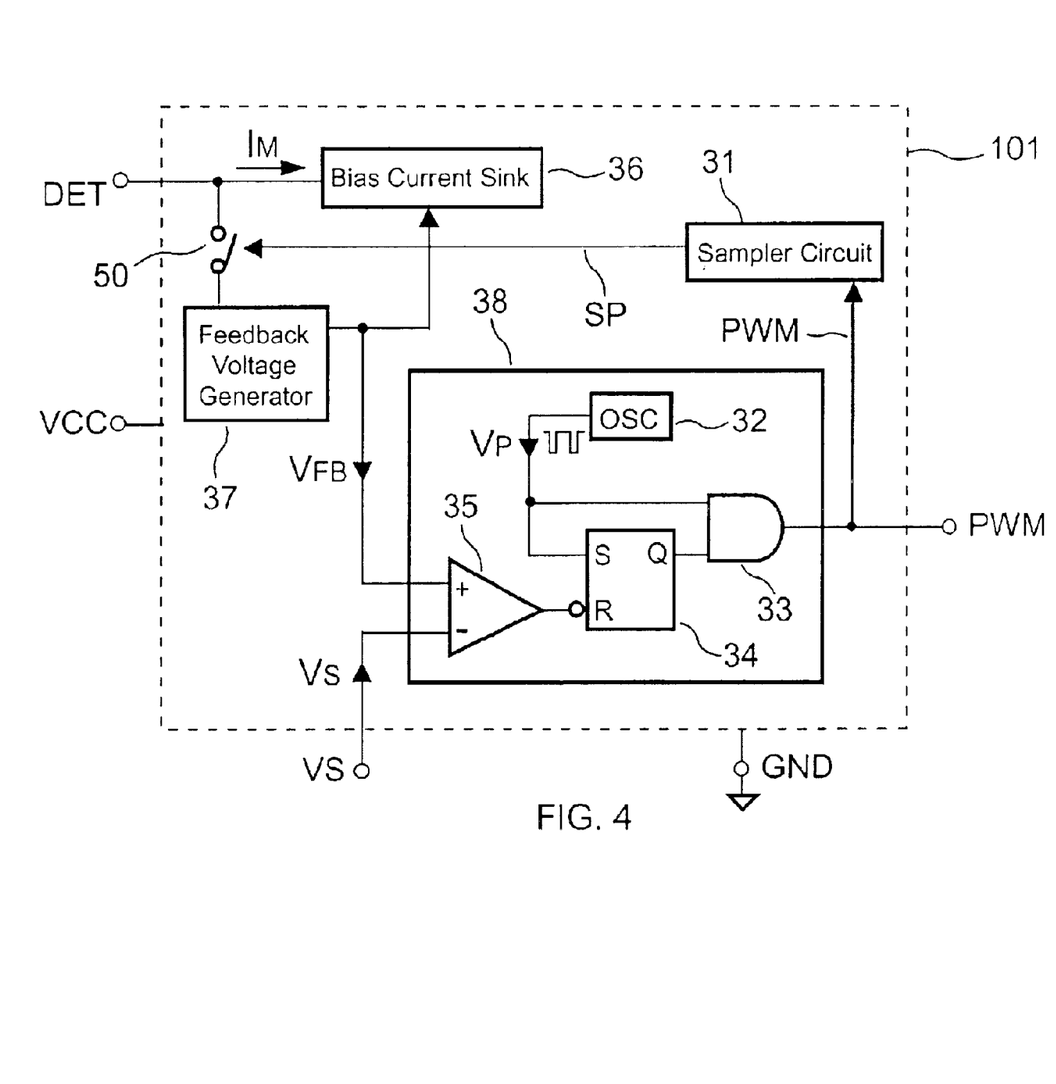
FIG. 4 shows the schematic diagram of the primary-side regulated PWM controller according to the present invention.

FIG. 4 shows a detailed view of the PWM controller 101 according to the present invention. The PWM controller 101 comprises a feedback voltage generator 37, a bias current sink 36, a sampler circuit 31, a sampling switch 50 and a pulse-width modulator 38. A detection input DET of the PWM controller 101 is connected to a detection resistor 200 shown in FIG. 3. The input terminal of the sampling switch 50 is connected to the detection input DET. The output terminal of the sampling switch 50 is connected to an input of the feedback voltage generator 37. The feedback voltage generator 37 outputs a feedback voltage $V_{FB}$, which is connected to an input of the bias current sink 36 and a first input of the pulse-width modulator 38. A second input of the pulse-width modulator 38 is a current-sense input VS of the PWM controller 101. The current-sense input VS is coupled to a sense resistor 210, which is connected to the source of a power MOSFET 300 shown in FIG. 3. An output of the pulse-width modulator 38 outputs a PWM signal to switch the power MOSFET 300. The sampler circuit 31 is driven by the output of the pulse-width modulator 38 and generates a sampling pulse signal SP. The sampling pulse signal SP is further connected to a control terminal of the sampling switch 50.

The pulse-width modulator 38 comprises a comparator 35, a RS flip-flop 34, an oscillator 32, and an AND-gate 33. The oscillator 32 generates a pulse signal $V_P$. The pulse signal $V_P$ sets a set-input of the RS flip-flop 34 and is connected to a first input of the AND-gate 33. A positive input of the comparator 35 is the first input of the pulse-width modulator 38. A negative input of the comparator 35 is the second input of the pulse-width modulator 38. An output of the comparator 35 is connected to a reset-input of the RS flip-flop 34. An output of the RS flip-flop 34 is connected to a second input of the AND-gate 33. The AND-gate 33 output the PWM signal.

Since both flyback voltages $V_1$ and $V_2$ are correlated with the output load conditions, the flyback voltage $V_1$ can reflect the output load status. Thus, the PWM controller 101 can detect the output load status from the primary side of the transformer 400. As load changes, the flyback voltage $V_1$ of the auxiliary winding of the transformer 400 is sampled and held by the feedback voltage generator 37 via the sampling switch 50 and the detection resistor 200. The feedback voltage generator 37 will generate the feedback voltage $V_{FB}$ in response to the flyback voltage $V_1$. As the voltage $V_s$ at the current-sense input VS is higher than the feedback voltage $V_{FB}$, the PWM signal will be turned off. In the meantime, the bias current sink 36 will sink a bias current $I_M$ in response to the feedback voltage $V_{FB}$. As load changes, the output current $I_O$ will generate different voltage drops across the output rectifying diode. The bias current $I_M$ will generate different voltage drops across the detection resistor 200 to well compensate the different voltage drops across the output rectifying diode.

Figure 5:
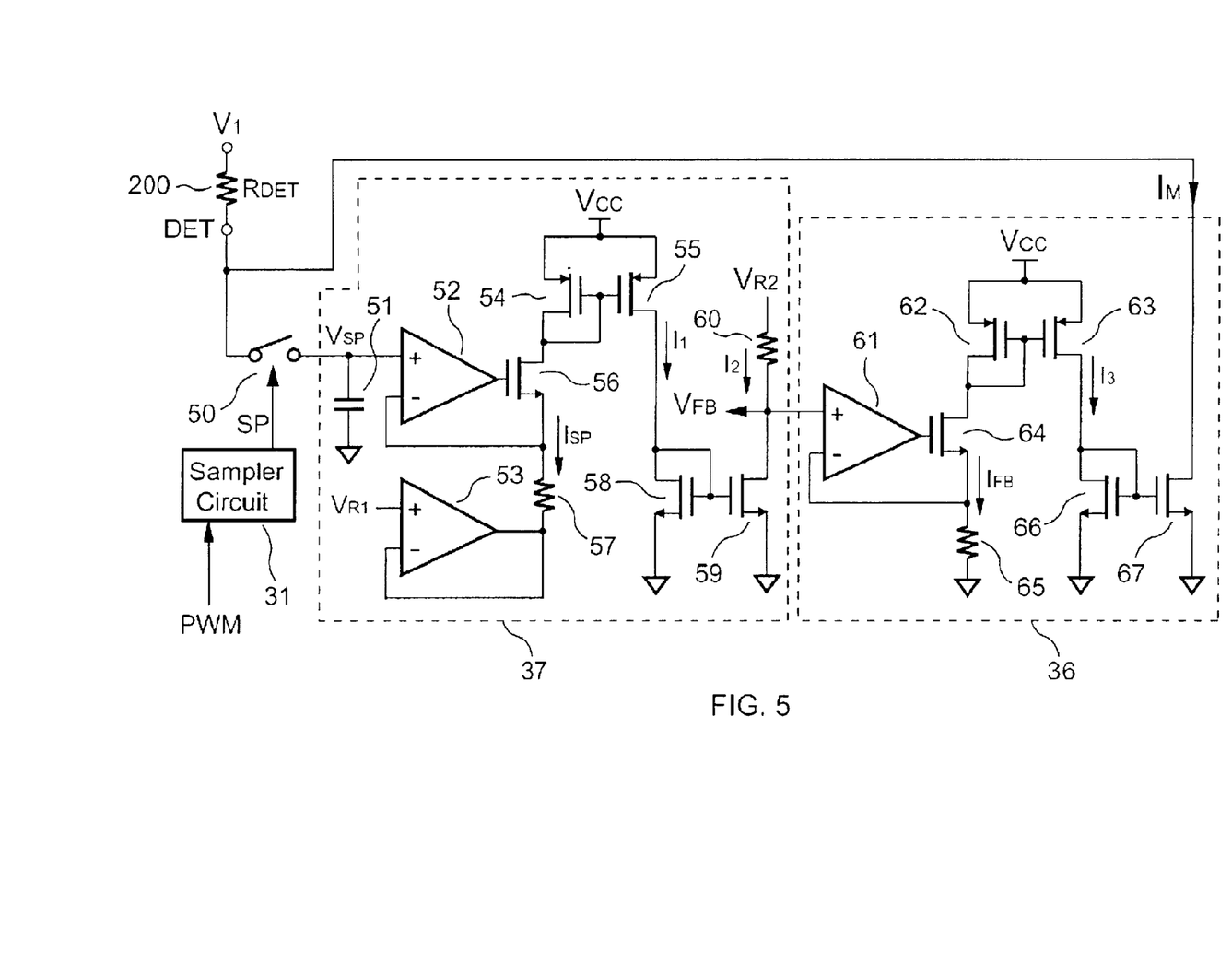
FIG. 5 shows a preferred embodiment of a feedback voltage generator and a bias current sink shown in FIG. 4, according to the present invention.

FIG. 5 shows one preferred embodiment of the feedback voltage generator 37 and the bias current sink 36 according to the present invention. The feedback voltage generator 37 comprises a capacitor 51, an operational amplifier (OPA) 52, an OPA 53, a transistor 56, a first current mirror composed of a transistor 54 and a transistor 55, a second current mirror composed of a transistor 58 and a transistor 59, a resistor 57 and a resistor 60. The capacitor 51 is connected between a positive input of the OPA 52 and a ground reference. An output of the OPA 52 is connected to a gate of the transistor 56. A negative input of the OPA 52 is connected to a source of the transistor 56. A first reference voltage $V_{R1}$ is connected to a positive input of the OPA 53. A negative input of the OPA 53 is connected to an output of the OPA 53. The resistor 57 is connected between the negative input of the OPA 52 and the negative input of the OPA 53. The sources of the transistors 54 and 55 are connected to the supply voltage VCC. A gate of the transistor 54, a gate of the transistor 55, a drain of the transistor 54 and a drain of the transistor 56 are tied together. A drain of the transistor 55, a drain of the transistor 58, a gate of the transistor 58 and a gate of the transistor 59 are tied together. A source of the transistors 58 and a source of the transistor 59 are both connected to the ground reference. The resistor 60 is connected between a second reference voltage $V_{R2}$ and a drain of the transistor 59. The feedback voltage $V_{FB}$ is derived from the drain of the transistor 59.

The bias current sink 36 comprises an OPA 61, a transistor 64, a resistor 65, a third current mirror composed of a transistor 62 and a transistor 63 and a fourth current mirror composed of a transistor 66 and a transistor 67. A positive input of the OPA 61 is connected to the drain of the transistor 59. An output of the OPA 61 is connected to a gate of the transistor 64. A negative input of the OPA 61 is connected to a source of the transistor 64. The resistor 65 is connected between the source of the transistor 64 and the ground reference. A drain of the transistor 62, a drain of the transistor 64, a gate of the transistor 62, and a gate of the transistor 63 are tied together. A source of the transistor 62 and a source of the transistor 63 are connected to the supply voltage $V_{CC}$. A drain of the transistor 63, a drain of the transistor 66, a gate of the transistor 66 and a gate of the transistor 67 are tied together. A source of the transistor 66 and a source of the transistor 67 are connected to the ground reference. A drain of the transistor 67 is connected to the detection input DET to pull the bias current $I_M$.

Referring to FIG. 3, when the output voltage $V_O$ decreases due to an increase in the load, the flyback voltage $V_2$ of the secondary winding will be reduced. Because the flyback voltages of the auxiliary winding and the secondary winding are correlated, the reduction in the flyback voltage $V_1$ will be proportional to the reduction in the flyback voltage $V_2$. The flyback voltage $V_1$ is coupled via the detection resistor 200 to the detection input DET of the PWM controller 101. The PWM signal drives the sampler circuit 31 to generate the sampling pulse signal SP to switch the sampling switch 50.

Further referring to FIG. 5, once the sampling switch 50 is turned on, the flyback voltage $V_1$ will charge the capacitor 51 of the feedback voltage generator 37. A sampled voltage $V_{SP}$ can be obtained from the capacitor 51. The transistor 56 converts the sampled voltage $V_{SP}$ into a sampled current $I_{SP}$, which can be expressed by the following equation, $$I_{SP} = (V_{SP} - V_{R1})/R_{57} \quad (4)$$

where $V_{R1}$ is the first reference voltage and $R_{57}$ is the resistance of the resistor 57.

A first current mirror mirrors a first current $I_1$, which can be expressed by the following equation, $$I_1 = N_1 \times I_{SP} \quad (5)$$

where $N_1$ is the mirror ratio of the first current mirror.

A second current mirror mirrors a second current $I_2$, which can be expressed by the following equation, $$I_2 = N_2 \times I_1 \quad (6)$$

where $N_2$ is the mirror ratio of the second current mirror.

The feedback voltage $V_{FB}$ derived from the drain of the transistor 59 can be expressed by the following equation, $$V_{FB} = V_{R2} \times I_2 \times R_{60} \quad (7)$$

where $V_{R2}$ is the second reference voltage, and $R_{60}$ is the resistance of the resistor 60.

The equations (4), (5), (6), and (7) show that as the load increases, the sampled voltage $V_{SP}$ will decrease, and the sampled current $I_{SP}$ will decreases too. The second current $I_2$ will decrease, and an increased feedback voltage $V_{FB}$ will then be obtained. While the feedback voltage $V_{FB}$ is high, the on-time of the PWM signal will be extended to provide more power, to meet the needs of the increased load. The increased feedback voltage $V_{FB}$ is then converted into an increased feedback current $I_{FB}$ by the transistor 64. Through a third current mirror, the increased feedback current $I_{FB}$ is mirrored into a third current $I_3$, which can be expressed by the following equation, $$I_3 = N_3 \times I_{FB} \quad (8)$$

where $N_3$ is the mirror ratio of the third current mirror.

A fourth current mirror pulls the bias current $I_M$, which is proportional to the third current $I_3$, wherein $$I_M = N_4 \times I_3 \quad (9)$$

where $N_4$ is the mirror ratio of the fourth current mirror.

The equations (7), (8), and (9) show that the bias current $I_M$ varies in direct proportion to the feedback voltage $V_{FB}$. The output voltage is $V_O = V_2 - V_{D2}$, where $V_{D2}$ is the voltage drop across the output rectifying diode $D_2$.

The flyback voltage $V_1$ of the auxiliary winding can be expressed by the following equation, $$V_1 = V_{RDET} + V_{DET} \quad (10)$$

where $V_{RDET}$ is the voltage drop across the detection resistor 200, and $V_{DET}$ is the voltage of the detection input DET. Thus, $$V_O = \frac{N_S}{N_A} \times (V_{RDET} + V_{DET}) - V_{D2} \quad (11)$$

$$\text{Select } V_{D2} = \frac{N_S}{N_A} \times V_{RDET} = \frac{N_S}{N_A} \times (I_M \times R_{DET}) \text{ then}$$

$$V_O = \frac{N_S}{N_A} \times V_{DET}$$

Because $V_{DET} = K_1 \times V_{SP}$, if the resistance of the resistor 57 is small, then the result can be approximated as $V_{SP} = V_{R1}$. Therefore, a desired output voltage $V_O$ can be obtained and its voltage will not be affected by various load conditions. It will be expressed by the following equation:

$$V_O = \frac{N_S}{N_A} \times K_1 \times V_{R1}$$

where $K_1$ is a constant, and the resistor 57 is used to reduce the feedback loop gain.

According to the present invention, the detection resistor 200 and the bias current $I_M$ compensate for variations to the voltage drop $V_{D2}$ under different load conditions. Under heavy load conditions, the bias current $I_M$ will increase and generate a higher voltage drop $V_{RDET}$. Thus, the flyback voltage $V_1$ will increase to compensate for the high voltage drop $V_{D2}$. Under light load conditions, the bias current $I_M$ will decrease and generate a lower voltage drop $V_{RDET}$, to compensate for the low voltage drop $V_{D2}$. Although different types of output rectifying diode $D_2$ will generate different voltage drops $V_{D2}$, proper selection of the resistor 200 ($R_{DET}$) will accurately offset the voltage drop $V_{D2}$ for different types of output rectifying diode $D_2$.

Figure 6:
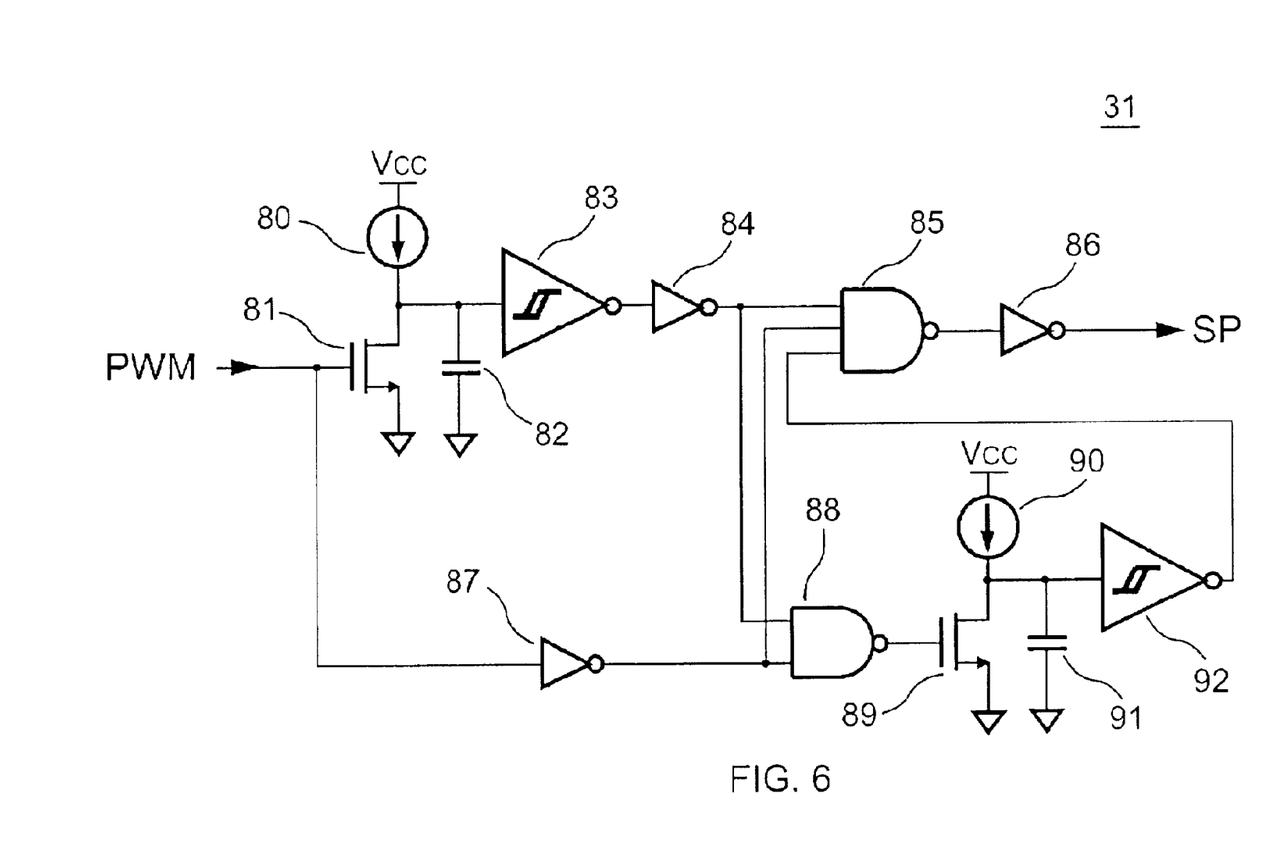
FIG. 6 shows a preferred embodiment of a sampler circuit shown in FIG. 4, according to the present invention.

FIG. 6 shows one preferred embodiment of the sampler circuit 31, which comprises a transistor 81, a transistor 89, a current source 80, a current source 90, a capacitor 82, a capacitor 91, a hysteresis comparator 83, a hysteresis comparator 92, a NOT-gate 84, a NOT-gate 87, a NOT-gate 86, a NAND gate 85 and a NAND gate 88. A gate of the transistor 81 is connected to the output of the AND-gate 33 shown in FIG. 4 and an input of the NOT-gate 87. A source of the transistor 81 is connected to the ground reference. The current source 80 is connected between the supply voltage $V_{CC}$ and a drain of the transistor 81. The drain of the transistor 81 is further connected to an input of the hysteresis comparator 83. The capacitor 82 is connected between the drain of the transistor 81 and the ground reference. An output of the hysteresis comparator 83 is connected to an input of the NOT-gate 84. An output of the NOT-gate 84 is connected to a first input of the NAND-gate 85 and a first input of the NAND-gate 88. An output of the NOT-gate 87 is connected to a second input of the NAND-gate 85 and a second input of the NAND-gate 88. An output of the NAND-gate 85 is connected to an input of the NOT-gate 86. An output of the NOT-gate 86 supplies the sampling pulse signal SP to the control terminal of the sampling switch 50. An output of the NAND-gate 88 is connected to a gate of the transistor 89. A source of the transistor 89 is connected to the ground reference. A current source 90 is connected between the supply voltage $V_{CC}$ and a drain of the transistor 89. An input of the hysteresis comparator 92 is connected to the drain of the transistor 89. The capacitor 91 is connected between the drain of the transistor 89 and the ground reference. An output of the hysteresis comparator 92 is connected to a third input of the NAND-gate 85.

As the PWM signal coupled to the gate of the transistor 81 becomes logic-high, the transistor 81 will be turned on and the current source 80 will be grounded. No current will flow into the capacitor 82. The output of the hysteresis comparator 83 will be logic-high. The NOT-gate 84 converts this logic-high signal and outputs a logic-low signal to set the output of the NAND-gate 85 to logic-high. The NOT-gate 86 converts this logic-high signal and outputs a logic-low sampling pulse signal SP. The logic-low sampling pulse signal SP will keep the sampling switch 50 shown in FIG. 5 open, so that the flyback voltage of the auxiliary winding will not be conducted to the feedback voltage generator 37. Once the PWM signal becomes logic-low, the second input of the NAND-gate 88 will become logic-high. In the meantime, the transistor 81 will be turned off, and the current source 80 will start to charge the capacitor 82. Until the voltage in the capacitor 82 reaches the upper-threshold voltage $V_{UT1}$ of the hysteresis comparator 83, the first input of the NAND-gate 88 will remain logic-low. Thus, the output of the NAND-gate 88 will be logic-high, which will ground the current source 90. The hysteresis comparator 92 will output a logic-high signal to the third input of the NAND-gate 85. The output of the NOT-gate 86 will remain logic-low. The current source 80 will charge the capacitor 82 continuously, and generates a delay time $t_d$ starting from the falling-edge of the PWM signal. Since Q=C×V=I×t, the delay time $t_d$ can be expressed by the following equation, $$t_d = \frac{C_{82} \times V_{UT1}}{I_{80}} \quad (12)$$

where $C_{82}$ is the capacitance of the capacitor 82, $V_{UT1}$ is the upper-threshold voltage of the hysteresis comparator 83, and $I_{80}$ is the current of the current source 80.

As the voltage in the capacitor 82 reaches the upper-threshold voltage $V_{UT1}$ of the hysteresis comparator 83, the output of the NOT-gate 84 will become logic-high. Therefore, the NOT-gate 86 will output a logic-high sampling pulse signal SP in response to the end of the delay time $t_d$. Meanwhile, both of the two inputs of the NAND-gate 88 will be logic-high. This will make the output of the NAND-gate 88 become logic-low. Thus, the transistor 89 will be turned off and the current source 90 will start to charge the capacitor 91, and determine a sample time $t_s$ for the pulse width of the sampling pulse signal SP. The following equation can express the charge of the capacitor 91:

$$t_S = \frac{C_{91} \times V_{UT2}}{I_{90}} \quad (13)$$

where $C_{91}$ is the capacitance of the capacitor 91, $V_{UT2}$ is the upper-threshold voltage of the hysteresis comparator 92, and $I_{90}$ is the current of the current source 90.

Figure 7:
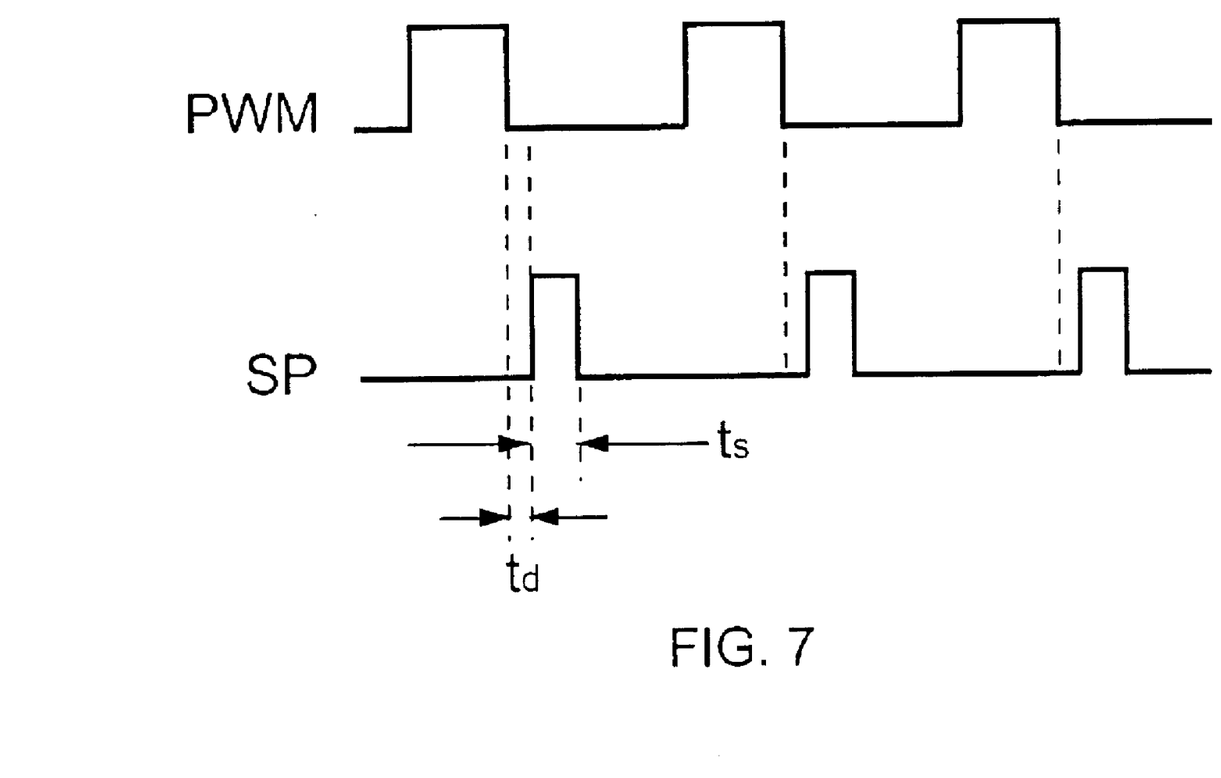
FIG. 7 shows the waveform observed from the sampler circuit of FIG. 6, according to the present invention.

Until the voltage of the capacitor 91 reaches the upper-threshold voltage $V_{UT2}$, the output of the hysteresis comparator 92 will remain logic-high and the sampling pulse signal SP will remain logic-high as well. After the sample time $t_S$ the hysteresis comparator 92 will output a logic-low signal to the third input of the NAND-gate 85. Thus, the sampling pulse signal SP becomes logic-low. The correlation of the sampling pulse signal SP and the PWM signal is shown in FIG. 7.

As described above, the feedback voltage generator 37 built in the PWM controller 101 generates the feedback voltage $VF_a$ by sampling the flyback voltage of the auxiliary winding during every PWM cycle to keep the voltage of the detection input DET constant. The bias current sink 36 pulls the bias current $I_m$ in response to load conditions. This varies the voltage drop across the detection resistor 200 to compensate for variations in the voltage drop across the output rectifying diode $D_2$. This results in a more precise output voltage and greatly improves load regulation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A primary-side PWM controller in a switch mode power supply, said primary-side PWM controller comprising:
   a DET input terminal for detecting a flyback voltage of an auxiliary winding of a transformer of said switch mode power supply, wherein said DET input terminal is connected to said auxiliary winding via a detection resistor;
   a bias current sink for pulling a bias current from said DET input terminal;
   a sampling switch controlled by a sampling pulse signal;
   a sampler circuit for generating said sampling pulse signal;
   a feedback voltage generator for generating a feedback voltage, wherein said feedback voltage generator is connected to said DET input terminal via said sampling switch; and
   a pulse-width modulator for generating a PWM signal in response to said feedback voltage, wherein said PWM signal operates a switch coupled to a primary winding of said transformer.

2. The primary-side PWM controller according to claim 1, wherein said PWM controller operates to regulate an output voltage of said switch mode power supply.

3. The primary-side PWM controller according to claim 1, wherein the magnitude of said feedback voltage is inversely proportional to the magnitude of said output voltage.

4. The primary-side PWM controller according to claim 1, wherein the amplitude of said bias current is proportional to the magnitude of said feedback voltage.

5. The primary-side PWM controller according to claim 1, wherein said bias current sink comprises:
   a first resistor;
   a first transistor for converting said feedback voltage into a feedback current, wherein said first transistor has a source connected to the ground reference via said first resistor;
   a first input buffer amplifier for controlling a gate of said first transistor, wherein said first input buffer amplifier has a positive input coupled to said feedback voltage and a negative input connected to the ground reference via said first resistor;

a first current mirror coupled to the supply voltage and a drain of said first transistor; and a second current mirror for pulling said bias current, wherein said second current mirror is coupled to said first current mirror and the ground reference.

6. The primary-side PWM controller according to claim 1, wherein the amplitude of said bias current is proportional to the amplitude of said feedback current.

7. The primary-side PWM controller according to claim 1, wherein said feedback voltage generator comprises:

a second resistor;

a second input buffer amplifier having a positive input coupled to said flyback voltage via said sampling switch, wherein said second input buffer amplifier has a negative input coupled to said second resistor;

a third input buffer amplifier having a positive input connected to a first reference voltage and a negative input, wherein said negative input is coupled to an output of said third input buffer amplifier and said second resistor;

a first capacitor for sampling and holding said flyback voltage to generate a sampled voltage, wherein said first capacitor is connected to the ground reference and said positive input of said second input buffer amplifier;

a second transistor for converting said sampled voltage into a sampled current, wherein said second transistor has a gate connected to an output of said second input buffer amplifier and a source connected to said output of said third input buffer amplifier via said second resistor;

a third current mirror coupled to the supply voltage and a drain of said second transistor;

a fourth current mirror for generating a mirrored sampled current, wherein said fourth current mirror is coupled to said third current mirror and the ground reference; and a third resistor for generating said feedback voltage from said mirrored sampled current, wherein said third resistor is coupled to said fourth current mirror and a second reference voltage.

8. The primary-side PWM controller to claim 7, wherein said mirrored sampled current is inversely proportional to said flyback voltage.

9. The primary-side PWM controller according to claim 1, wherein said sampler circuit comprises:

a first current source for generating a first charge current, wherein said first current source is coupled to the supply voltage;

a second capacitor coupled to the ground reference, wherein said second capacitor is charged by said first charge current;

a third transistor for switching said first charge current, wherein said third transistor has a gate controlled by said PWM signal, a drain coupled to said first current source and a source connected to the ground reference;

a first hysteresis comparator has an input terminal connected to said drain of said third transistor; and a first NOT-gate for generating a delay-time signal, wherein said NOT-gate has an input connected to an output of said first hysteresis comparator.

10. The primary-side PWM controller according to claim 1, wherein said sampler circuit further comprises:

a second current source for generating a second charge current, wherein said second current source is connected to the supply voltage;

a third capacitor coupled to the ground reference, wherein said third capacitor is charged by said second charge current;

a fourth transistor for switching said second charge current, wherein said fourth transistor has a drain coupled to said second current source and a source connected to the ground reference;

a first NAND-gate for controlling a gate of said fourth transistor, wherein said first NAND-gate has a first input coupled to said delay-time signal;

a second NOT-gate for supplying an inverted PWM signal to a second input of said first NAND-gate, wherein said second NOT-gate has an input coupled to said PWM signal; and a second hysteresis comparator for generating a sample-time signal, wherein said second hysteresis comparator has an input coupled to said third capacitor.

11. The primary-side PWM controller according to claim 1, wherein said sampler circuit further comprises:

a second NAND-gate for generating an inverted sampling pulse signal, wherein said second NAND-gate has a first input coupled to said delay-time signal, a second input coupled to said inverted PWM signal and a third input coupled to said sample-time signal; and a third NOT-gate for generating said sampling pulse signal, wherein said third NOT-gate having an input connected to an output of said second NAND-gate.

12. The primary-side PWM controller according to claim 11, wherein a delay time of said sampling pulse signal is a function of the capacitance of said second capacitor and the amplitude of said first charge current, wherein said delay time occurs after the falling-edge of each PWM cycle.

13. The primary-side PWM controller according to claim 11, wherein a pulse width of said sampling pulse signal is a function of the capacitance of said third capacitor and the amplitude of said second charge current, wherein said sampling pulse signal is generated after said delay time.

14. The switch mode power supply according to claim 1, wherein said pulse-width modulator comprises:

a comparator for generating an reset signal, wherein said comparator has a positive input connected to said feedback signal and a negative input connected to a sense voltage, wherein said sense voltage is converted from a primary current of said transformer;

an oscillator for generating a pulse signal;

a RS flip-flop for generating an on-off signal, wherein said RS flip-flop is set by said pulse signal and reset by an output of said comparator;

an AND-gate for generating said PWM signal, said AND-gate having a first input connected to said pulse signal and a second input connected to said on-off signal.

15. The primary-side PWM controller according to claim 14, wherein a frequency of said oscillator determines a switching frequency of said PWM signal.

* * * * *

UNITED STATES PATENT AND TRADEMARK OFFICE
CERTIFICATE OF CORRECTION

PATENT NO. : 6,836,415 B1
DATED : December 28, 2004
INVENTOR(S) : Ta-Yung Yang et al.

It is certified that error appears in the above-identified patent and that said Letters Patent is hereby corrected as shown below:

<u>Title page,</u>
Item [73], Assignee, change "Systems General Corp." to -- System General Corp. --

Signed and Sealed this

Fifth Day of April, 2005

JON W. DUDAS
*Director of the United States Patent and Trademark Office*